United States Patent Office

2,965,631
WATER-SOLUBLE AZO DYES FOR POLYACRYLIC FIBER

Mario Francesco Sartori, Wilmington, Del., assignor to E. I. du Pont de Nemours and Company, Wilmington, Del., a corporation of Delaware No Drawing. Filed Oct. 23, 1958, Ser. No. 769,089

2 Claims. (Cl. 260—155)

This invention relates to novel water-soluble, organic compounds useful as dyes for polyacrylic fiber such as the sulfonate modified acrylic fibers described in U.S.P. 2,837,500 and 2,837,501. It is an object of this invention to provide novel dyes of the above type applicable to sulfonate modified polyacrylonitrile fiber from an acidic aqueous bath to produce yellow dyeings of good fastness to light, and being particularly characterized by constancy of the shade produced, irrespective of the degree of acidity of the dye bath. The last mentioned quality is of particular value when dyeing union fabrics which contain wool fiber in addition to the polyacrylic fiber, it being noted that wool generally requires a dye bath of relatively high acidity. Other objects and achievements of this invention will become apparent as the description proceeds.

According to this invention, the above objects are achieved by applying to said fiber, from an acidic aqueous bath, the novel water-soluble compounds defined hereinbelow and forming part of this invention. These compounds may be defined broadly as cationic monoazo dyes, free from sulfo and carboxy groups, and containing a hydroxy quinoline radical as coupling component. More particularly, they may be expressed by the formula

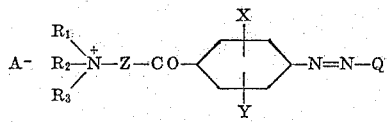

wherein Q is the radical of a hydroxy heterocyclic compound of the group consisting of 8-hydroxy-quinoline, 2,4-dihydroxy-quinoline, 1,3-dihydroxy-isoquinoline and 4-hydroxy-1-methyl-2-quinoline, X and Y are members of the group consisting of hydrogen, methyl, chlorine and bromine, Z is an alkylene radical (normal or branched) having from 1 to 3 C-atoms, $R_1$ is an alkyl radical of 1 to 4 C-atoms, $R_2$ is a radical of the group consisting of alkyl and hydroxyalkyl and possessing from 1 to 4 C-atoms, $R_3$ is a radical of the group consisting of alkyl, hydroxyalkyl and benzyl, said alkyls being radicals of 1 to 4 C-atoms each, and $A^-$ is a water solubilizing anion. In other words, $A^-$ is the anion of a water-soluble acid, which may be inorganic or organic, and which is typified by hydrochloric, acetic, sulfuric, phosphoric acid, etc.

My novel compounds are prepared in a manner generally following the synthesis set forth by S. N. Boyd, Jr., in U.S.P. 2,821,526 for analogous compounds which employ other coupling compounds than hydroxy heterocyclic compounds (and which compounds do change the shade of their dyeings if the pH of the dye bath is less than a particular minimum for each dye). In other words, a monoquaternary diamine of formula

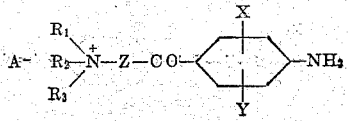

wherein X, Y, Z, $R_1$, $R_2$ and $R_3$ have the same significance as above, while $A^-$ is the anion of a strong mineral acid (such as hydrochloric or sulfuric acid), is diazotized in conventional manner using an acid of form HA (wherein A may or may not correspond to the anion $A^-$ in the quaternary compound) and is coupled in alkaline aqueous medium and at below room temperature (5° to 10° C.) to a hydroxy heterocyclic component Q, as above defined. The azo dye thus produced, which is sparingly soluble in cold water may be recovered directly by filtration. The requisite initial monoquaternary diamine may be prepared as in Examples IX, XI, XII, XIV(a) and XV(a) of said Boyd patent.

Application of the novel dyes to polyacrylonitrile fiber may be made from an acid aqueous bath at about pH 4 to 5, at customary dyeing temperatures (180° to 212° F.). Application to union fabrics containing polyacrylic fiber and wool is carried out advantageously at 212° F. in a dye bath containing about 2% (by weight of the fiber) of glacial acetic acid, 2% of sodium acetate and 2% of a non-ionic surface active agent, such as Emulphor ON (a condensation product of oleyl alcohol or cetyl alcohol with ethylene oxide). The dyeings thus obtained are bright, fast, hydrolytically-stable, shade-stable, and they build up to heavy shades on the polyacrylic fibers.

Without limiting this invention, the following examples are given to illustrate my preferred mode of operation. Parts mentioned are by weight.

Example 1

A solution of 2.28 parts of p-aminophenacyl-trimethyl-ammonium chloride in 28 parts of water and 3.5 parts of 36% aqueous hydrochloric acid is cooled to 5° to 10° C., and the amine is diazotized by the addition of 0.7 part of sodium nitrite. An excess of nitrous acid is maintained in the solution for 30 minutes (potassium iodide-starch paper test) and is then removed by the addition of a small amount of sulfamic acid. This diazo solution is then added in about 30 minutes to a stirred aqueous solution containing 1.61 parts of 2,4-dihydroxy-quinoline and 2.5 parts of sodium carbonate. During this addition, the reaction mixture is maintained at 5° to 10° C. and at pH 8 by the addition of sodium carbonate. The slurry is stirred at 5° to 10° C. for 8 hours, then for 16 hours at room temperature. The precipitate is then filtered off, washed with 10% sodium chloride aqueous solution and dried. The new dye has the structure

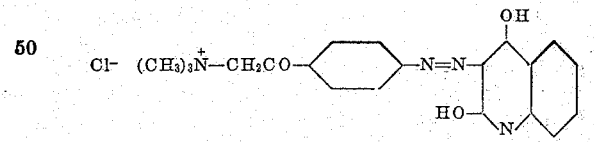

The product thus obtained is a yellow powder, which dissolves readily in warm water to give a yellow solution. It dyes sulfonate modified acrylic fiber from a weakly acidic dye bath in bright yellow shades of good fastness properties. The absorption maximum of a solution of this compound in ethanol is located at 412 millimicrons.

When the p-aminophenacyl-trimethylammonium chloride of this example is replaced with 2.4 parts of [2-(p-aminobenzoyl)-ethyl]-trimethylammonium chloride, prepared as described in Example XIV(a) of U.S. 2,821,526, one obtains a similar yellow dye for sulfonate modified acrylic fiber.

Likewise, when said p-amino compound of this example is replaced with 3.4 parts of [3-(p-aminobenzoyl)propyl]triethylammonium bromide (prepared by the method disclosed by H. W. Linnell and S. V. Vora, the Journal of Pharmacy and Pharmacology, volume 4, No. 1, pages 62-64, 1952) or with 2.4 parts of (p-aminoalpha - methylphenacyl)trimethylammonium chloride (prepared as described in Example XV(a) of U.S. 2,821,526), products are obtained which dye sulfonate modified acrylic fiber in yellow shades.

*Example 2*

A solution of diazotized p-aminophenacyl-trimethylammonium chloride, prepared as described in Example 1, is added in about 30 minutes to a stirred aqueous solution of 1.61 parts of 1,3-dihydroxyisoquinoline and 2 parts of sodium hydroxide while maintaining the temperature of the reaction mixture at 5° to 10° C. The pH is maintained at 9 by the addition of sodium hydroxide. The slurry is stirred and the dye isolated as described in Example 1. The dye obtained has the formula

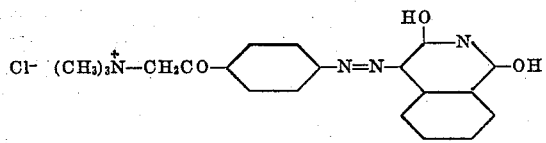

It dyes sulfonate modified acrylic fiber in greenish yellow shades of good fastness properties.

*Example 3*

A solution of diazotized p-aminophenacyl-trimethylammonium chloride, prepared as described in Example 1, is allowed to run into an aqueous solution containing 1.75 parts of 4-hydroxy-1-methyl-2-quinolone and 2.5 parts of sodium carbonate. Coupling and isolation of the dye formed are carried out as described in Example 1. This dye has the formula

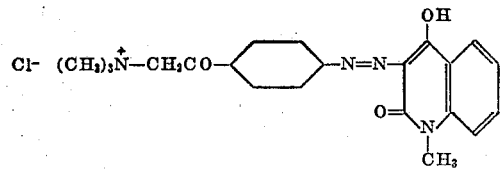

It dyes sulfonate modified acrylic fiber greenish yellow shades of good fastness properties.

*Example 4*

A solution of 6 parts of p-acetaminophenacyl-dimethyl(beta-hydroxyethyl)ammonium chloride in 60 parts of water and 25 parts of 36% hydrochloric acid is heated at boiling temperature for 0.5 hour, iced at 0° C. and diazotized by the addition of 1.38 parts of sodium nitrite (as a 34.5% aqueous solution). An excess of nitrous acid is maintained in the solution for 20 minutes and is then destroyed by the addition of a small amount of sulfamic acid. This diazo solution is then added at 5° to 10° C. to a stirred solution of 3.3 parts of 2,4-dihydroxyquinoline in 20 parts of water containing sufficient sodium carbonate to maintain a pH of 8. The coupling and the isolation of the dye are carried out as described in Example 1. The dye obtained has the formula

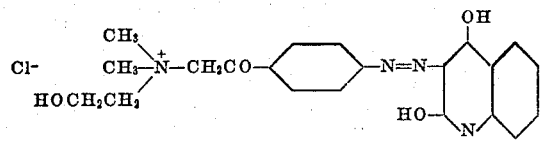

It dyes sulfonate modified acrylic fiber in yellow shades having good fastness properties.

When the p - acetaminophenacyl - dimethyl(beta-hydroxyethyl)ammonium chloride in this example is replaced by 6.9 parts of p-acetaminophenacyl-benzyl-dimethylammonium chloride, one obtains a yellow basic dye having similar properties.

Likewise, in this example, when the 2,4-dihydroxyquinoline is replaced by an equivalent amount of either 1,3-dihydroxyisoquinoline or 4-hydroxy-1-methyl-2-quinolone, similar yellow basic dyes are obtained.

*Example 5*

A solution of diazotized p-aminophenacyl-trimethylammonium chloride, prepared as described in Example 1, is added in about 30 minutes to a stirred aqueous solution of 1.4 parts of 8-hydroxy-quinoline and 2 parts of sodium carbonate. The coupling and isolation proccesesses are carried out as described in Example 1. The compound obtained dyes sulfonate-modified acrylic fiber orange-yellow shades of good fastness properties and has the structure

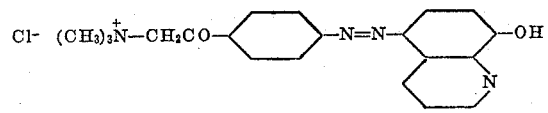

*Example 6*

In similar manner as in the above examples, the following combinations of diazo and coupling components may be synthesized to give yellow dyes, which exhibit excellent fastness properties on sulfonate modified acrylic fiber.

| Diazo Component | Coupling Component |
| --- | --- |
| (a) (4-amino-3-bromophenacyl) tri-methylammonium chloride | 1,3-dihydroxyisoquinoline. |
| (b) (4-amino-3-bromophenacyl) tri-methylammonium chloride | 8-hydroxy-quinoline. |
| (c) (4-amino-3-bromophenacyl) tri-methylammonium chloride | 2,4-dihydroxy-quinoline. |
| (d) (4-amino-2,5-dimethylphenacyl)-trimethylammonium chloride | 1,3-dihydroxyisoquinoline. |
| (e) (4-amino-2,5-dimethylphenacyl)-trimethylammonium chloride | 2,4-dihydroxy-quinoline. |
| (f) (4-amino-2-chlorophenacyl) tri-methylammonium chloride | Do. |
| (g) (4-amino-2-chlorophenacyl) tri-methylammonium chloride | 4-hydroxy-1-methyl-2-quinolone. |
| (h) (4-amino-3,5-dibromophenacyl)-trimethylammonium chloride | Do. |
| (i) (4-amino-3,5-dibromophenacyl)-trimethylammonium chloride. | 8-hydroxy-quinoline. |
| (j) (4-amino-3,5-dibromophenacyl)-trimethylammonium chloride | 2,4-dihydroxy-quinoline. |
| (k) (4-amino-3,5-dibromophenacyl)-trimethylammonium chloride. | 1,3-dihydroxyisoquinoline. |

The diazo components listed in this table are prepared as described, respectively, in Examples XI, IX(e), IX(d) and XII of U.S. 2,821,526. In lieu of these, those mentioned at the end of Example 1 above (wherein Z is an alkylene other than $CH_2$) may also be used.

It will be understood that the details of the above examples can be varied widely without departing from the spirit of this invention. For instance, the Cl anions indicated in the above formulas may be replaced by other anions of water-soluble salts. Such replacement may be made in the initial choice of the corresponding mono-quaternary diamine; for instance, one may start in Example 1 with p-aminophenacyl-trimethylammonium sulfate or phosphate, and carry out the diazotization by the aid of sulfuric or phosphoric acid, respectively. Or the final dye may be subjected to the customary reaction of exchange with an optional acid. Altogether, the nature of the anion in the dye is not critical as long as it renders the dye soluble in water.

Many other variations in detail will be readily apparent to those skilled in the art.

I claim as my invention:

1. A compound of the formula

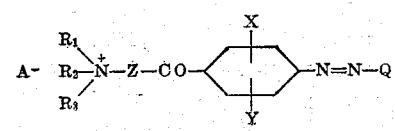

wherein Q is the radical of a hydroxy heterocyclic compound of the group consisting of 8-hydroxy-quinoline, 2,4-dihydroxy-quinoline, 1,3-dihydroxy-isoquinoline and 4-hydroxy-1-methyl-2-quinolone, X and Y are members of the group consisting of hydrogen, methyl, chlorine and bromine, Z is an alkylene radical having from 1 to 3 C-atoms, $R_1$ is an alkyl radical of 1 to 4 C-atoms, $R_2$ is a radical of the group consisting of alkyl and hydroxyalkyl and possessing from 1 to 4 C-atoms, $R_3$ is a radical of the group consisting of alkyl, hydroxyalkyl and benzyl, said alkyls being radicals of 1 to 4 C-atoms each, and $A^-$ is a water-solubilizing anion.

2. The compound of the formula

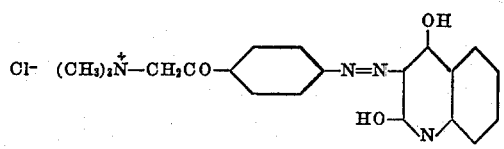

References Cited in the file of this patent
UNITED STATES PATENTS 2,173,056    Hitch et al. _____ Sept. 12, 1939
2,821,526    Boyd _____ Jan. 28, 1958